(12) United States Patent
Finley

(10) Patent No.: US 7,743,912 B2
(45) Date of Patent: Jun. 29, 2010

(54) LIQUID SEAL BULK FEEDER FOR DESTRUCTIVE DISTILLATION OF LIGHTWEIGHT MATERIALS

(76) Inventor: Dana J. Finley, 3206 Candelaria Rd., NE., Albuquerque, NM (US) 87107-1907

( * ) Notice: Subject to any disclaimer, the term of this patent is extended or adjusted under 35 U.S.C. 154(b) by 788 days.

(21) Appl. No.: 11/494,877

(22) Filed: Jul. 28, 2006

(65) Prior Publication Data

US 2007/0029184 A1  Feb. 8, 2007

Related U.S. Application Data

(60) Provisional application No. 60/706,355, filed on Aug. 5, 2005.

(51) Int. Cl.
 - B65G 33/32 (2006.01)
 - B65G 33/26 (2006.01)
 - B65G 33/00 (2006.01)
 - B65G 47/22 (2006.01)

(52) U.S. Cl. .................. 198/666; 198/667; 198/668; 198/671; 198/493

(58) Field of Classification Search ............. 198/666, 198/662, 667, 668, 671, 493
See application file for complete search history.

(56) References Cited

U.S. PATENT DOCUMENTS

| | | | |
|---|---|---|---|
| 1,447,297 A | 3/1923 | Day | |
| 1,595,239 A | 8/1926 | Minton | |
| 2,029,985 A | 2/1936 | Clark et al. | |
| 3,385,695 A | 5/1968 | Howie | |
| 3,504,177 A | 3/1970 | Walker et al. | |
| 3,729,105 A | 4/1973 | Huebler et al. | |
| 4,247,240 A | 1/1981 | Schora, Jr. et al. | |
| 4,287,157 A | 9/1981 | Koch | |
| 4,326,556 A | 4/1982 | Deutsch et al. | |
| 4,579,562 A | 4/1986 | Tarman et al. | |
| 5,125,771 A * | 6/1992 | Herman et al. | 406/57 |
| 5,207,904 A * | 5/1993 | Abel | 210/252 |
| 5,714,043 A * | 2/1998 | Finley et al. | 202/262 |
| 5,871,619 A | 2/1999 | Finley et al. | |
| 6,722,593 B1 * | 4/2004 | Dobozy | 241/29 |
| 7,275,893 B2 * | 10/2007 | Rexius et al. | 406/197 |
| 2001/0030107 A1 * | 10/2001 | Simpson | 198/670 |

* cited by examiner

Primary Examiner—Gene Crawford
Assistant Examiner—Yolanda Cumbess
(74) Attorney, Agent, or Firm—Rod D. Baker

(57) ABSTRACT

A conveyor feeding system for reliably and continuously supplying particulate matter as feedstock, such as rubber tire chips, to a reactor or distillation unit. The feeding system includes a pair of inclined spiral augers having their lower ends submerged in oil or other liquid to provide a liquid seal, thereby preventing undesirable back flow of distillation gases through the feeding system. The push auger acts to push lightweight feedstock downward, submerging it through the liquid seal. The material thereafter is taken up by the partially submerged feed auger, for withdrawal up out of the liquid seal for delivery to further processing, such as a pyrolytic reactor. Buoyant material, which otherwise might float upon the liquid of the seal reservoir, accordingly may be effectively processed through the system. An inlet valve, through which feedstock is introduced into the push auger, can be opened and closed in coordination with the rotation of the push auger, so that material is fed smoothly into the liquid seal reservoir. The inlet valve also may be of a type which prevents backflow of gas from the push auger to material inlet valve.

19 Claims, 1 Drawing Sheet

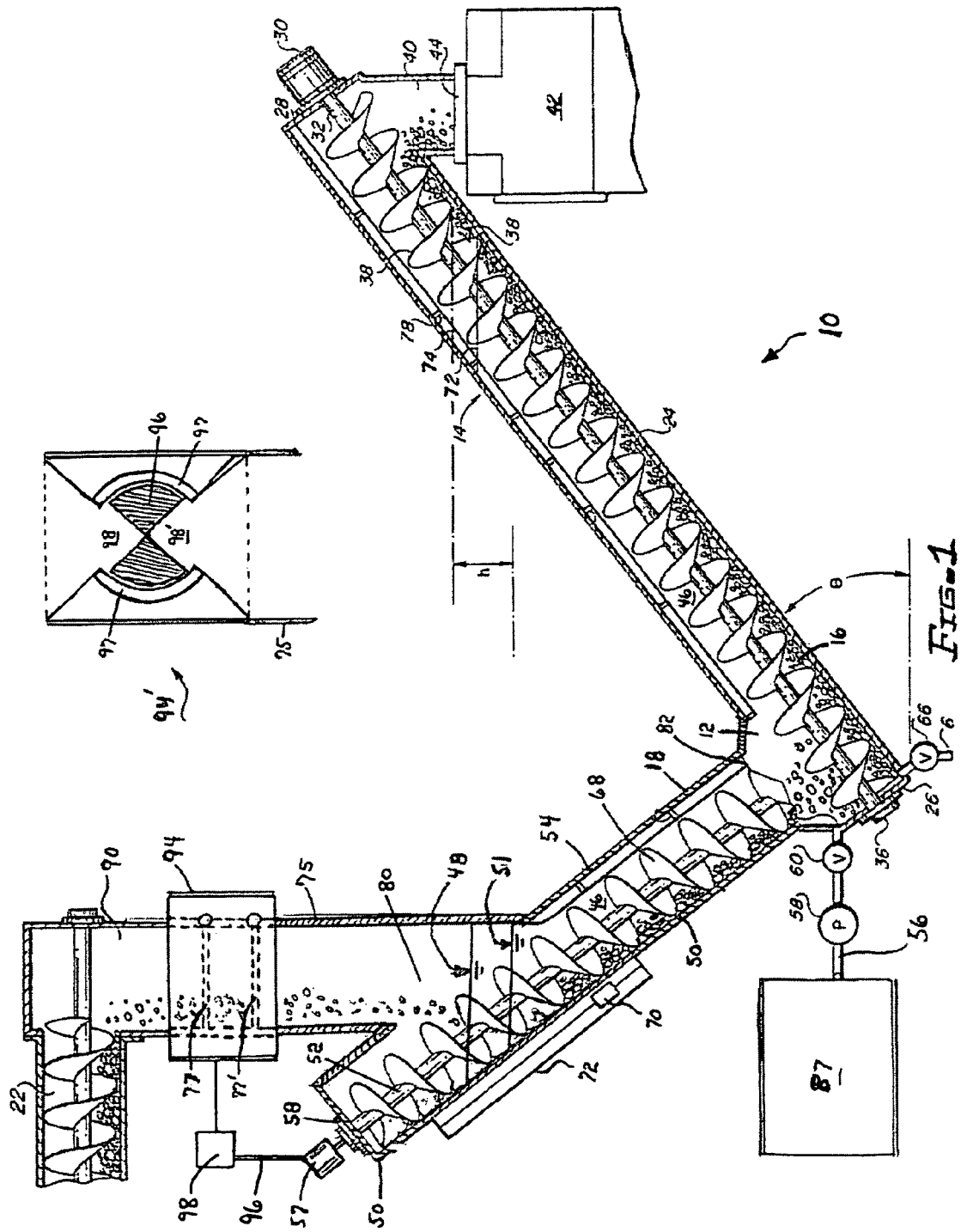

LIQUID SEAL BULK FEEDER FOR DESTRUCTIVE DISTILLATION OF LIGHTWEIGHT MATERIALS

CROSS-REFERENCE TO RELATED APPLICATIONS

This application claims the benefit of the filing of U.S. Provisional Patent Application Ser. No. 60/706,355 entitled "Liquid Seal Bulk Feeder for Destructive Distillation of Lightweight Materials," filed on Aug. 5, 2005, and the specification thereof is incorporated herein by reference.

BACKGROUND OF THE INVENTION

1. Field of the Invention (Technical Field)

The present invention relates to an apparatus for feeding bulk carbonaceous material, such as chips of used automobile tires, to a destructive distillation unit while sealing against exchange of ambient air and distillation gases through the feeding system. More especially, the present invention relates to a feeding apparatus which permits the feeding of comparatively low-density feedstock material through the liquid seal.

2. Background Art

One of the inherent problems in the art of destructive distillation of carbonaceous solids, such as bulk chips of automobile tires, is to accomplish effective feeding or charging of the distillation unit. The problem is compounded when one attempts to feed bulk solid materials to a continuously operating still while maintaining a seal between the atmosphere and the still such that flammable gases from the destructive distillation process do not mix with oxygen-containing gases, such as atmospheric air, which results in damaging explosions and fires in the still and feeding system.

The present disclosure is related to the device disclosed in U.S. Pat. No. 5,714,043 to Finley et al. The '043 patent was co-invented by the present Applicant, and solved many of the afore-mentioned problems associated with supplying feedstock into a distillation system while reliably isolating the pyrolytic chamber from the ambient atmosphere.

A significant potential drawback to the device of the '043 patent, however, is its inability to reliably feed low-density material into the distillation system. The device of the '043 patent to Finley et al. employs a liquid seal to isolate the pyrolysis chamber. The '043 device relies nearly exclusively on gravitational forces to move the feedstock through the liquid seal. Thus, only feedstock having a density exceeding the bulk density of the liquid in the seal reliably sinks through the seal to then be mechanically conveyed toward the pyrolytic camber(s). This circumstance may pose difficulty when the liquid is heavy (e.g. oil) and the feedstock is comparatively lightweight waste (such as chipped computer circuit boards, for example).

Also, it has been determined that the device of the '043 patent may not adequately regulate the introduction of feedstock, resulting in the binding of the auger and other problems. The use of a simple continuous feeding mechanism, such as the horizontal screw conveyor of the '043 patent, permits irregular, marginally controlled, "lump" insertion of feedstock. It is desirable better to coordinate the timing of the feed with the operation of the feed auger that moves the stock through the liquid seal.

The present invention marks a significant improvement to the system seen in U.S. Pat. No. 5,714,043 to Finley et al. According to the present disclosure, feedstock materials can be reliably and safely fed through the liquid seal of the apparatus, regardless of their density.

SUMMARY OF THE INVENTION

A conveyor feeding system for reliably and continuously supplying particulate matter as feedstock, such as rubber tire chips, to a reactor or distillation unit. The feeding system includes a pair of inclined spiral augers having their lower ends submerged in oil or other liquid to provide a liquid seal, thereby preventing undesirable back flow of distillation gases through the feeding system. The push auger acts to push lightweight feedstock downward, submerging it through the liquid seal. The material thereafter is taken up by the partially submerged feed auger, for withdrawal up out of the liquid seal for delivery to further processing, such as a pyrolytic reactor. Buoyant material, which otherwise might float upon the liquid of the seal reservoir, accordingly may be effectively processed through the system. An inlet valve, through which feedstock is introduced into the push auger, can be opened and closed in coordination with the rotation of the push auger, so that material is fed smoothly into the liquid seal reservoir. The inlet valve also may be of a type which prevents backflow of gas from the push auger to material inlet valve.

BRIEF DESCRIPTION OF THE DRAWINGS

The accompanying drawings, which are incorporated into and form a part of the specification and, together with the description, serve to explain the principles of the invention. The drawings are only for the purpose of illustrating a preferred embodiment of the invention and are not to be construed as limiting the invention. In the drawings:

FIG. 1 is a schematic side sectional view of a preferred embodiment of the apparatus according to the present disclosure; and FIG. 1A is a side sectional view of an alternative version of the material inlet valve useable in accordance with the disclosed apparatus.

DESCRIPTION OF THE PREFERRED EMBODIMENTS (BEST MODES FOR CARRYING OUT THE INVENTION)

The present disclosure permits lightweight feedstock to be fed through a liquid seal in a destructive distillation device, such as a bulk-processor for the pyrolytic breakdown of waste materials. There is an assortment of waste materials, including but not limited to shredded passenger car tires, which contain hydrocarbons that may be recovered through pyrolysis. However, some such materials may be comparatively lightweight, posing significant problems in passing them through a liquid seal en route to a pyrolytic chamber. The context of the disclosure is provided by reference to U.S. Pat. No. 5,714,043 to Finley et al., the entire disclosure of which is incorporated herein by reference. It is understood, however, that the disclosure may find utility in any situation where the movement of lightweight material through a liquid seal is indicated; it is not intended to limit the application of the present disclosure solely to the field of pyrolitic systems for hydrocarbon recovery.

The present disclosure employs a pusher auger (distinct from the feed auger of U.S. Pat. No. 5,714,043) to force the feedstock downward through the liquid seal. A valve assembly operates in coordination with the pusher auger to provide for the correct pre-selected feed rate. By mechanically pushing the feedstock into the liquid seal, the problem of low-density feedstock floating out the seal is ameliorated or eliminated; feedstock of any relative density or buoyancy is reliably moved through the liquid seal at the proper rate for the system.

Attention is invited to drawing FIG. 1. The inventive liquid seal feed system 10 includes a fluid reservoir 12, inclined push auger 50, and inclined feed auger 14. The inclined feed auger 14 is connected at its lower end with the lower end of fluid reservoir 12, at feed auger inlet 16. The push auger 50 has an outlet 82 at its lower end by which material may be expelled from within the interior of push auger. Feed auger inlet 16 is the open lower end of the feed auger 14 by which material may pass from the push auger outlet 82 (via reservoir 12) and into the interior of the feed auger 14. Fluid reservoir 12 includes reservoir wall 18 extending upwardly from feed auger inlet 16, reservoir wall 18 being so configured as to form a closure capable of containing a liquid (i.e., the sealing liquid) therein.

Inclined feed auger 14 includes cylindrical auger casing 24, lower auger end cap 26, and upper auger end cap 28, and is disposed at a selected angle θ to the horizontal. This angle of incline θ of said feed auger conveyor with the horizontal preferably is from about 20 degrees to about 60 degrees. A feed auger drive motor 30 is located at upper auger end cap 28 and drives auger drive shaft 32 of rotating auger 14 at a desired rotational speed. Auger drive shaft 32 extends along the central longitudinal axis of feed auger 14, as defined by cylindrical auger casing 24, and is supported for rotation at its lower end by a suitable drive shaft bearing located on lower auger end cap 26. The lower drive shaft bearing (not shown) is sealed, according to known means, against the entry of liquids and particulates from within the casing 24 into the bearings.

Rotating auger 14 features helical shaped spiral flight 38 located on auger drive shaft 32. Spiral flight 38 extends across the cross section of feed auger 14 so as to maintain a relatively small clearance between its outer edge and the inner wall of cylindrical auger casing 24. Feed auger outlet 40 is located and extends downward near the upper end of inclined feed auger 14, and is connected with the underside of cylindrical auger casing 24. Material conveyed by the feed auger 14 thus may fall by gravity through the outlet 40 toward some other conveyance, whereby the material is moved to downstream system components and processes, such as a pyrolytic distillation chamber or chambers. In the embodiment depicted in FIG. 1, for example, a slam gate valve 44 separates feed auger outlet 40 and a distillation unit 42.

Continued reference is made to FIG. 1. The push auger 50 is connected angularly to the lower end of the feed auger 14. A portion of the reservoir wall 18 is configured to define the lower reach of cylindrical push auger casing 54, which is closed at its upper end by pusher auger end cap 58. The lower end of the pusher auger casing 54 is in sealed connection with the lower end of the feed auger casing 24, so that the interiors of the respective casings 24, 54 are in fluid communication. The outlet 82 of the pusher auger 50 thus is adjacent to the inlet 16 of the feeder auger 14 in the vicinity of the reservoir 12. The push auger 50, including casing 54, is disposed at a selected angle to the horizontal; as seen in FIG. 1, the feed auger 14 and the push auger 50 define a nearly right angle, plus or minus about five to fifteen degrees. An auger drive motor 57 is located at pusher auger end cap 58 and imparts controlled rotary motion to pusher auger drive shaft 52 of the push auger 50. Push auger drive shaft 52 extends along the central longitudinal axis of push auger 50, as defined by cylindrical push auger casing 54. The lower end of the pusher auger is supported (not shown) for rotation at its lower end by a suitable support means connected to the lower end of the pusher auger casing 54. Rotating push auger conveyor 50 features helical shaped spiral flight 68 located on pusher auger drive shaft 52. Pusher flight 68 extends across the cross section of push auger 50 so as to maintain a relatively small clearance between its outer edge and the inner wall of pusher auger casing 54.

Notably, the direction of rotation of the push auger 50 is such that the rotating flight 68 pushes feedstock within the push auger casing 54 downward toward the junction of push auger casing 54 with feed auger casing 24.

Spiral flights 38, 68 extend across the cross section of feed auger 14 and push auger 50 respectively so as to maintain a relatively small clearance of approximately 3 millimeters between the outer edge of an auger flight and the inner wall of the respective cylindrical auger casing. More than one spiral flight may be mounted along an auger drive shaft 32, 52 if desired. Feed auger outlet 40 is located near the upper end of inclined feed auger 14 and is connected with the underside of cylindrical auger casing 24 and extends downward to distillation unit 42.

Sealing liquid 46, such as oil, is located in reservoir 12 and extends into the inclined push auger 50 to operating reservoir liquid level 48. When operating under vacuum conditions in distillation unit 42, sealing liquid 46 assumes the vacuum reservoir liquid level 51, which becomes the effective operating reservoir liquid level in the push auger 50. Sealing liquid 46 also extends from the reservoir 12 into inclined feed auger 14 to operating feed auger liquid level 72. When operating under vacuum conditions in the distillation unit 42, sealing liquid 46 assumes the vacuum feed auger liquid level 74 during operation of the apparatus. The head of liquid in the liquid seal feed system is h, the difference in fluid levels 51 and 74.

Makeup fluid inlet 56 is located at the lower end of fluid reservoir 12. Makeup fluid pump 58 supplies makeup fluid from a suitable reservoir 87. Flow of liquid through makeup fluid inlet 56 from makeup fluid pump 58 is controlled by makeup liquid valve 60, which may be automatic or manually operated.

Liquid drain 69 is located at the lower end of feed auger 14. Flow of liquid through liquid drain 69 is controlled by liquid drain valve 66, which may be automatic or manually operated.

Float level control 70 operates within a high/low level zone within a level control float housing 72, which is elongated in shape and located vertically along the length of reservoir wall 18 and in liquid communication with the portion of reservoir 12 defined by and contained within the pusher auger casing 54. Float level control 70 monitors and provides an indication of the liquid level in fluid reservoir 12. The operating fluid level in the apparatus thus may be regulated, and the level maintained within necessary limits. The float level control 70 also may operate, optionally in conjunction with a CPU digital processor or other controls known in the art, to function as a failsafe against critically low levels of liquid in the auger reservoir 12. If liquid in the reservoir falls to a level below the junction of the two auger casings 24, 54, air may pass from the apparatus inlet 90 to the outlet 40 with catastrophic results (e.g., and explosion in the pyrolytic reactor area. Thus, the float level control 70 can be programmed to automatically trigger an emergency shutdown of the entire system in the event of accidental critically low levels of seal liquid 46.

A feedstock port 90 is operatively connected to the push auger casing 54, and is the means through which feedstock is supplied to the apparatus. The port 90 has an inlet valve 94 and duct 75. Feedstock is conveyed to the inlet 90 (by, for example, a feed screw conveyor 22), where it may be gravity-fed into the apparatus. Feedstock is provided at inlet 90 and allowed to drop to the inlet valve 94. The inlet valve 94 periodically opens and closes, and when open permits the feedstock material to fall via the duct 75 to the push auger 50.

It is seen that sealing liquid 46 is supplied to the apparatus 10 to rise to a level in both auger casings 24 and 54. Material to be processed must therefore pass through the liquid 46 in transit from the feedstock port 90 to the feed auger outlet 40. This is in accordance with the objects and advantages of the device disclosed in U.S. Pat. No. 5,714,043.

A marked advantage of the present disclosure is the use of the inlet valve 94 to regulate the manner and rate of feeding material into the apparatus 10. Inlet valve 94 is in signal communication (e.g., electronic or mechanical circuitry 96, optionally aided by digital processing in a CPU 98) with said pusher auger motor 57, so that the actuation of the valve 94 is coordinated with the rotation of the push auger 50. The rotation of the push auger 50 likewise preferably is coordinated (as by electronic signal from CPU 98) with the rotation of the feed auger 14. Thus, the push auger 50 (or its drive motor 57) is in signal communication with the feed auger 14 (or its drive motor 30), so that the rotary action of the feed auger is operatively coordinated with the rotation of the push auger; by such coordination, the spiral flights of the respective augers can be operated in registration, such that material passes smoothly from a rotating flight of the push auger into an aligned flight of the feed auger.

Inlet valve 94 is any of a number of valve types which provides for continuous sealing of the duct 75 against uninterrupted air flow from inlet 90, yet permits periodic passage of solid feedstock there-through. Preferably the inlet valve 94 is a compartmentalized rotary valve. Alternatively, the inlet valve may be a double flat gate, i.e., a series of two (or more) planar panels 77, 77' as depicted in FIG. 1. The flat gate panels 77, 77' alternately pivot, slide or swing between open and closed positions, whereby when one panel 77 is open to allow passage of solid feedstock, another panel 77' is closed to prevent bulk discharge of air through the valve 94.

The inlet valve 94 preferably, but not necessarily is compartmentalized rotary valve. Referring to FIG. 1A, such a rotary valve 94' has transverse component(s) 96 in constant sliding sealing contact with the insides 97 of the valve, so that air cannot freely continuously flow through the valve 94 in either direction. The version of FIG. 1A features two compartments, but it is understood that a plurality of three or more radially symmetric compartments may be embodied in the valve 94'. The valve's compartments 98, 98' (two or more symmetrically arrayed around the axis of rotation) serially receive solid material dropped from the port inlet 90. As the valve 94 rotates, each compartment 98 or 98' in turn moves into alignment below the inlet 90 and thus receives a quantity of feed stock material there-from. The load-bearing compartment 98 or 98' rotates until it is inverted to open downward, at which time the material contained therein falls from the valve 94 toward the push auger 50 (via the duct 75 connecting the valve 94 to the push auger casing 54).

Thus, the use of a double flat gate valve, rotary compartment valve, or the like, permits a series of measured mini-batches of process material to be fed into the apparatus. The deposition of the feedstock is periodic, corresponding to the cycle of the inlet valve 94. The rate at which a double flat gate valve is opened/closed, or the rate at which a rotary valve rotates, dictates the frequency with which feedstock intermittently but regularly is dropped down the duct 75 into the push auger 50. The overall size and configuration of the valve 94 itself affects the volume of material that is fed into the push auger 50 with each actuation/opening of the valve 94.

An advantage of the use of a rotary or double-flat-gate valve as described is the prevention of potentially harmful back-flow through the valve 94 toward the port inlet 90. In the event of a sudden and dramatic pressure increase in the apparatus 10, such as might result from an explosion in a downstream system (such as a pyrolysis chamber), the valve 94 serves as a check valve to prevent harmful (to personnel and/or equipment) discharge of oil or other material out the inlet 90. This check valve safety is provided by the fact that a rotary valve or double flat gate valve is always in a configuration closed against sudden fluid discharge.

Another advantage of the disclosure is that the operation of the inlet valve 94 can be coordinated, mechanically or electronically, with the operation of the pusher auger 50. In the preferred embodiment, the actuation/rotation of the valve 94 is timed to correspond with the rate of rotation of the pusher auger 50 so that a discrete mini-batch of feed material is dropped by the valve into an associated segment (or selected number of segments) of the flight 68 of the auger 50. For example, the operation of the valve 94 can be regulated by any suitable means, including the use of a central processing unit, such that the valve 94 releases a measured volume of feed material only when the blade flight 68 of the push auger 50 is ideally situated to receive the mini-batch of material. Accordingly, feed stock drops between adjacent blade flights of the pusher auger 50, and only at the optimal rate to prevent overloading or binding of the auger 50 (which limiting factor may be a function of the selected rate of auger rotation). By way of illustrative example only, the valve 94 may be timed to drop a dollop of material only after the immediately previous dollop has been ejected from the lower end of the push auger 50 and into the feed auger 14.

The pusher auger 50 rotates so that the screwing action pushes material downward toward the feed auger 14. Thus, the buoyancy, if any, of the feed stock material in the sealing liquid 46 is overcome by the action of the push auger 50. Material dropped from the valve 94 which otherwise would float upon the sealing liquid 46 at level 48 accordingly is drawn through the sealing liquid for delivery to the feed auger outlet 40.

Preferably, the rotation of the pusher auger 50 similarly is coordinated with the rotation of the feed auger 14, so that material is passed smoothly from the lower end of the pusher auger to the flight 38 of the feed auger. The terminus of the spiral blade defining the flights of the pusher auger 50 is substantially adjacent, topologically, to the moving peripheral edge of a spiral flight 38 of the feed auger 14; thus the lower distal end of the pusher auger 50 is nearly at the imaginary cylinder containing the feed auger casing 24. However, because the feed auger casing 24 is discontinuous where the two casings 24 and 54 intersect, material pushed along the push auger 50 is expelled directly into the flights of the feed auger 14, which then lifts all the process material up and out of the liquid 46 for delivery to the feed auger outlet 40.

The process according to the disclosure is readily apparent from the foregoing, but is summarized in the interest of complete disclosure. A feedstock material is selected for processing. The feedstock may include material having a density less than the density of the sealing liquid 46. It is possible according to the process of the disclosure to select as feedstock a waste stream comprising a wide variety of materials, such as a mixture of dense matter (such as chipped automobile tires) and relatively light matter (such as ground circuit boards) or practically any substance from which useful ingredient (e.g., hydrocarbons) may be distilled.

The process material is fed into the port inlet 90 for disposition into the inlet valve 94. Provision of process material into the port inlet 90 may be continual, provided only that the rate of supply not exceed the average throughput of the valve

94. The feed material accumulates briefly the valve 94, which periodically opens (or rotates through a given angle) to allow a fixed quantity of feed material to drop into the interior of the pusher auger casing 54. Preferably, the actuation of the valve 94 is in registration with the turning of the push auger 50, so that material falls between designated flights of the blade in the auger 50.

While material having densities exceeding that of the sealing liquid 46 tend to fall down the push auger 50 by the action of gravity, less dense material is forcibly submerged beneath the sealing liquid by the action of the push auger 50. The entire surface of the liquid 46 standing in the pusher auger casing 54 is intercepted by the diameter of the spiral blade flight 68, so that no material is allowed to float on the liquid surface for any appreciable period of time. Rather, lightweight materials are dragged beneath the surface (against the forces from buoyancy) by the action of the auger 50, and pushed continuously down toward the bottom of the feed auger conveyor 14. Heavier materials fall from inside the bottom of the pusher auger casing 54 and into the flight of the revolving feed auger 14. Less dense materials are augured to the bottom of the push auger casing 54. Material then is expelled into the action of the feed auger 14 which pushes material of all densities up the interior of the feed auger casing 24, until it falls from the outlet 40 for delivery to downstream processing modules.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. A liquid sealed conveyor apparatus for continuously feeding particulate material, such as chips of used automobile tires, to a reactor or distillation unit while maintaining a seal against the exchange of distillation gases and atmospheric air comprising:
    an inclined pusher auger having an outlet at a lower end thereof and an inlet;
    an inclined feed auger having an inlet at a lower end thereof and an outlet at an upper end thereof, said feed auger inlet being connected to and in liquid communication with said pusher auger outlet;
    said pusher auger and said feed auger being partially filled with a liquid to an operating reservoir liquid level and an operating feed auger liquid level, respectively, wherein said pusher auger inlet is above, and said pusher auger outlet is below, said operating reservoir liquid level;
    whereby action of the rotation of said pusher auger pushes particulate material entering said pusher auger inlet into said liquid, beneath said operating reservoir liquid level and to said feed auger inlet, and whereby the particulate material then is engaged and transported by action of the rotation of said feed auger to a point above said feed auger liquid level, and is discharged through said feed auger outlet for delivery to said reactor or distillation unit.

2. An apparatus according to claim 1 wherein said liquid is oil.

3. An apparatus according to claim 1 wherein each of said pusher auger and said feed auger comprises a cylindrical auger casing and a corresponding rotatable spiral auger flight disposed therein, and wherein each said cylindrical auger casing and corresponding spiral flight has a small clearance of about 3 millimeters there-between, whereby said cylindrical auger casing and said rotatable spiral auger act as a seal against the flow there-through of gas surges from said reactor or distillation unit.

4. An apparatus according to claim 1 further comprising:
    a makeup liquid inlet in the vicinity of said push auger outlet;
    a makeup liquid pump for introducing makeup liquid to said makeup liquid inlet; and
    a makeup liquid valve for controlling the introduction of makeup liquid from said pump through said makeup liquid inlet.

5. An apparatus according to claim 4 further comprising a level control float in operative communication with said liquid within said push auger, said level control float being free to rise and fall with the liquid level in said pusher auger, said level control float operable to indicate the level of liquid in said fluid reservoir.

6. An apparatus according to claim 1 further comprising an inlet valve in operative connection with said pusher auger, above said operating reservoir liquid level, for regulating the feeding of particulate material into said pusher auger.

7. An apparatus according to claim 6 further comprising an auger drive motor for powering said push auger, wherein said inlet valve is in signal communication with said auger drive motor, whereby that the actuation of said inlet valve is coordinated with the rotation of said push auger.

8. An apparatus according to claim 7 wherein said signal communication is aided by a digital central processing unit.

9. An apparatus according to claim 8 further comprising a feed auger drive motor for powering said feed auger, wherein said push auger is in signal communication with said feed auger drive motor, whereby the actuation of said feed auger is coordinated with the rotation of said push auger.

10. An apparatus according to claim 6 further comprising:
    an apparatus inlet through which material may be introduced to said inlet valve; and
    a duct for directing material from said inlet valve to said pusher auger; wherein said inlet valve provides for continuous sealing of the duct against uninterrupted air flow from said inlet, yet permits periodic passage of material from said inlet to said duct.

11. An apparatus according to claim 10 wherein said inlet valve comprises a compartmentalized rotary valve.

12. An apparatus according to claim 10 wherein said inlet valve comprises a double alternating flat gate.

13. A liquid sealed conveyor apparatus for continuously feeding particulate material, such as chips of used automobile tires, to a reactor or distillation unit while maintaining a seal against the exchange of distillation gases and atmospheric air comprising:
    an inclined pusher auger having an outlet at a lower end thereof and an inlet;
    an inclined feed auger having an inlet at a lower end thereof and an outlet at an upper end thereof, said feed auger inlet being connected to and in liquid communication with said pusher auger outlet; and
    an inlet valve in operative connection with said pusher auger, above said operating reservoir liquid level, for regulating the feeding of particulate material into said pusher auger;
    said pusher auger and said feed auger being partially filled with a liquid to an operating reservoir liquid level and an operating feed auger liquid level, respectively, wherein said feeder auger inlet is below, and said feeder auger outlet is above, said operating feed auger liquid level;
    whereby action of the rotation of said pusher auger pushes particulate material entering said pusher auger inlet into said liquid, beneath said operating reservoir liquid level and to said feed auger inlet, and whereby the particulate material then is engaged and transported by action of the rotation of said feed auger to a point above said feed auger liquid level, and is discharged through said feed auger outlet for delivery to said reactor or distillation unit.

14. An apparatus according to claim 13 further comprising an auger drive motor for powering said push auger, wherein said inlet valve is in signal communication with said auger drive motor, whereby that the actuation of said inlet valve is coordinated with the rotation of said push auger.

15. An apparatus according to claim 14 wherein said signal communication is aided by a digital central processing unit.

16. An apparatus according to claim 14 further comprising a feed auger drive motor for powering said feed auger, wherein said push auger is in signal communication with said feed auger drive motor, whereby the actuation of said feed auger is coordinated with the rotation of said push auger.

17. An apparatus according to claim 13 further comprising:
 an apparatus inlet through which material may be introduced to said inlet valve; and
 a duct for directing material from said inlet valve to said pusher auger; wherein said inlet valve provides for continuous sealing of the duct against uninterrupted air flow from said inlet, yet permits periodic passage of material from said inlet to said duct.

18. An apparatus according to claim 17 wherein said inlet valve comprises a compartmentalized rotary valve.

19. An apparatus according to claim 17 wherein said inlet valve comprises a double alternating flat gate.

* * * * *